US011336662B2

(12) United States Patent
Hong et al.

(10) Patent No.: US 11,336,662 B2
(45) Date of Patent: May 17, 2022

(54) TECHNOLOGIES FOR DETECTING ABNORMAL ACTIVITIES IN AN ELECTRIC VEHICLE CHARGING STATION

(71) Applicant: ABB Schweiz AG, Baden (CH)

(72) Inventors: Junho Hong, Cary, NC (US); Hyojong Lee, Cary, NC (US); Zhenyuan Wang, Apex, NC (US)

(73) Assignee: ABB Schweiz AG, Baden (CH)

( * ) Notice: Subject to any disclaimer, the term of this patent is extended or adjusted under 35 U.S.C. 154(b) by 280 days.

(21) Appl. No.: 16/197,399

(22) Filed: Nov. 21, 2018

(65) Prior Publication Data

US 2020/0162487 A1 May 21, 2020

(51) Int. Cl.
*H04L 29/06* (2006.01)
*B60L 53/14* (2019.01)
*B60L 53/66* (2019.01)
*B60L 53/31* (2019.01)
*B60L 53/63* (2019.01)

(52) U.S. Cl.
CPC .......... *H04L 63/1416* (2013.01); *B60L 53/14* (2019.02); *B60L 53/31* (2019.02); *B60L 53/63* (2019.02); *B60L 53/665* (2019.02); *H04L 63/1425* (2013.01); *H04L 63/1441* (2013.01); *B60L 2270/32* (2013.01); *B60L 2270/38* (2013.01)

(58) Field of Classification Search
CPC ............. H04L 63/1416; H04L 63/1425; H04L 63/1441; H04L 63/1408; B60L 53/60
USPC .......................................................... 726/23
See application file for complete search history.

(56) References Cited

U.S. PATENT DOCUMENTS

| | | | | |
|---|---|---|---|---|
| 4,139,896 A | * | 2/1979 | Finger | G06G 7/1813 324/94 |
| 5,596,258 A | * | 1/1997 | Kimura | B60L 53/16 320/163 |
| 7,707,044 B2 | * | 4/2010 | Graves | G16H 80/00 705/2 |
| 9,496,736 B1 | * | 11/2016 | Johansson | H02J 7/0047 |
| 10,532,663 B2 | * | 1/2020 | Ricci | B60L 53/35 |
| 2010/0185357 A1 | * | 7/2010 | Mizumachi | B60L 53/11 701/31.4 |
| 2012/0043941 A1 | * | 2/2012 | Lee | H01M 10/44 320/134 |
| 2012/0190386 A1 | * | 7/2012 | Anderson | G01S 19/14 455/456.3 |
| 2012/0235646 A1 | | 9/2012 | Lo et al. | |

(Continued)

OTHER PUBLICATIONS

Falliere et al., "W32.Stuxnet Dossier", Symantec, Feb. 2011, 69 pages.

(Continued)

*Primary Examiner* — Michael W Chao
*Assistant Examiner* — Peiliang Pan
(74) *Attorney, Agent, or Firm* — Armstrong Teasdale LLP (57) ABSTRACT

Technologies for detecting abnormal activities in an electric vehicle charging station include an apparatus. The apparatus includes circuitry configured determine a cyber security threat level for the charging station in which the electric vehicle charger is located. Additionally, the circuitry is configured to perform, as a function of the determined cyber security threat level, a responsive action to protect the charging station from a cyber security threat.

18 Claims, 5 Drawing Sheets

(56) References Cited

U.S. PATENT DOCUMENTS

| | | | | |
|---|---|---|---|---|
| 2012/0274287 | A1* | 11/2012 | Ree | H02J 7/0026 320/162 |
| 2013/0043838 | A1* | 2/2013 | Tsuchiya | B60L 53/50 320/109 |
| 2014/0036989 | A1* | 2/2014 | Heinrich | H04L 61/2007 375/238 |
| 2014/0189860 | A1 | 7/2014 | Hull Roskos | |
| 2014/0257884 | A1* | 9/2014 | Kyoung | G06Q 10/02 705/5 |
| 2014/0316939 | A1* | 10/2014 | Uyeki | B60L 58/12 705/26.9 |
| 2015/0113275 | A1 | 4/2015 | Kim et al. | |
| 2015/0185750 | A1* | 7/2015 | Langemeyer | H02J 3/381 700/291 |
| 2015/0210287 | A1* | 7/2015 | Penilla | G06F 3/04842 701/49 |
| 2015/0288201 | A1* | 10/2015 | Hatakeyama | B60L 3/04 320/107 |
| 2016/0026659 | A1* | 1/2016 | Harley | H04W 4/44 707/758 |
| 2016/0273927 | A1* | 9/2016 | Kitajima | B60L 53/665 |
| 2017/0111347 | A1 | 4/2017 | Kim et al. | |
| 2018/0105051 | A1* | 4/2018 | Zheng | G06Q 20/3276 |
| 2018/0365771 | A1* | 12/2018 | Kilburn | G07C 5/0808 |
| 2019/0039465 | A1* | 2/2019 | Jang | H02J 50/10 |
| 2019/0113632 | A1* | 4/2019 | Lucrecio | G01S 5/0294 |
| 2019/0122561 | A1* | 4/2019 | Shimizu | G08G 1/202 |
| 2019/0184842 | A1* | 6/2019 | Waters | H02J 7/0047 |
| 2019/0285703 | A1* | 9/2019 | Juva | H02J 7/0013 |
| 2019/0291277 | A1* | 9/2019 | Oleynik | B25J 9/163 |
| 2019/0349426 | A1* | 11/2019 | Smith | H04L 67/104 |
| 2019/0361694 | A1* | 11/2019 | Gordon | G06F 1/169 |
| 2020/0207231 | A1* | 7/2020 | Suzuki | H01M 10/44 |

OTHER PUBLICATIONS

Dragos, "Crashoverride: Analyzing the Threat to Electric Grid Operations", Dragos Inc., Jun. 2017, 36 pages.

Industrial Control Systems Cyber Emergency Response Team (ICSCERT), Cyber-Attack Against Ukrainian Critical Infrastructure, Feb. 2016, 4 pages.

H. Chaudhry and T. Bohn, "Security concerns of a plug-in vehicle," 2012 IEEE PES Innovative Smart Grid Technologies (ISGT), Washington, DC, 2012, pp. 1-6.

S. Abedi, A. Arvani, and R. Jamalzadeh, "Cyber security of plugin electric vehicles in smart grids: Application of intrusion detection methods," in Plug In Electric Vehicles in Smart Grids, ser. Power Systems. Springer Singapore, 2015, pp. 129-147.

European Search Report and Written Opinion for EP 19206942.5-1202, dated Dec. 6, 2019, 6 pages.

* cited by examiner

TECHNOLOGIES FOR DETECTING ABNORMAL ACTIVITIES IN AN ELECTRIC VEHICLE CHARGING STATION

BACKGROUND

Cyberattacks on critical infrastructures are evolving, and their patterns are diversifying, particularly for energy delivery systems. Cyberattacks can damage physical systems by compromising their Information Technology (IT) infrastructure and gaining access to the controls and monitoring of energy delivery systems, without a requiring a physical attack. Further, electric vehicle (EV) penetration is an increasing transportation modernization trend and has resulted in more charging facilities and cybersecurity concerns for energy delivery systems. For example, as the demand of higher-power charging (>200 kW) to reduce charging time brings forth eXtreme Fast Charging (XFC) stations, the potential impact of cyberattacks on the power distribution grid is much higher than for lower- and medium-power charging facilities. EV charging infrastructures will likely continue to move toward higher power, increased automation, and greater control by/integration with electric distribution utilities. As such, the potential for grid instability and other malfunctions resulting from coordinated attacks against such higher powered and more automated charging stations will likely continue to increase.

SUMMARY OF THE INVENTION

In one aspect, the present disclosure provides an electric vehicle charger. The electric vehicle charger includes circuitry configured to determine a cyber security threat level for a charging station in which the electric vehicle charger is located. Additionally, the circuitry is configured to perform, as a function of the determined cyber security threat level, a responsive action to protect the charging station from a cyber security threat.

In another aspect, the present disclosure provides a method. The method includes determining, by an electric vehicle charger, a cyber security threat level for a charging station in which the electric vehicle charger is located. The method also includes performing, by the electric vehicle charger and as a function of the determined cyber security threat level, a responsive action to protect the charging station from a cyber security threat.

In yet another aspect, the present disclosure provides one or more machine-readable storage media having a plurality of instructions stored thereon that, in response to being executed, cause an electric vehicle charger to determine a cyber security threat level for a charging station in which the electric vehicle charger is located. The instructions also cause the electric vehicle charger to perform, as a function of the determined cyber security threat level, a responsive action to protect the charging station from a cyber security threat.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
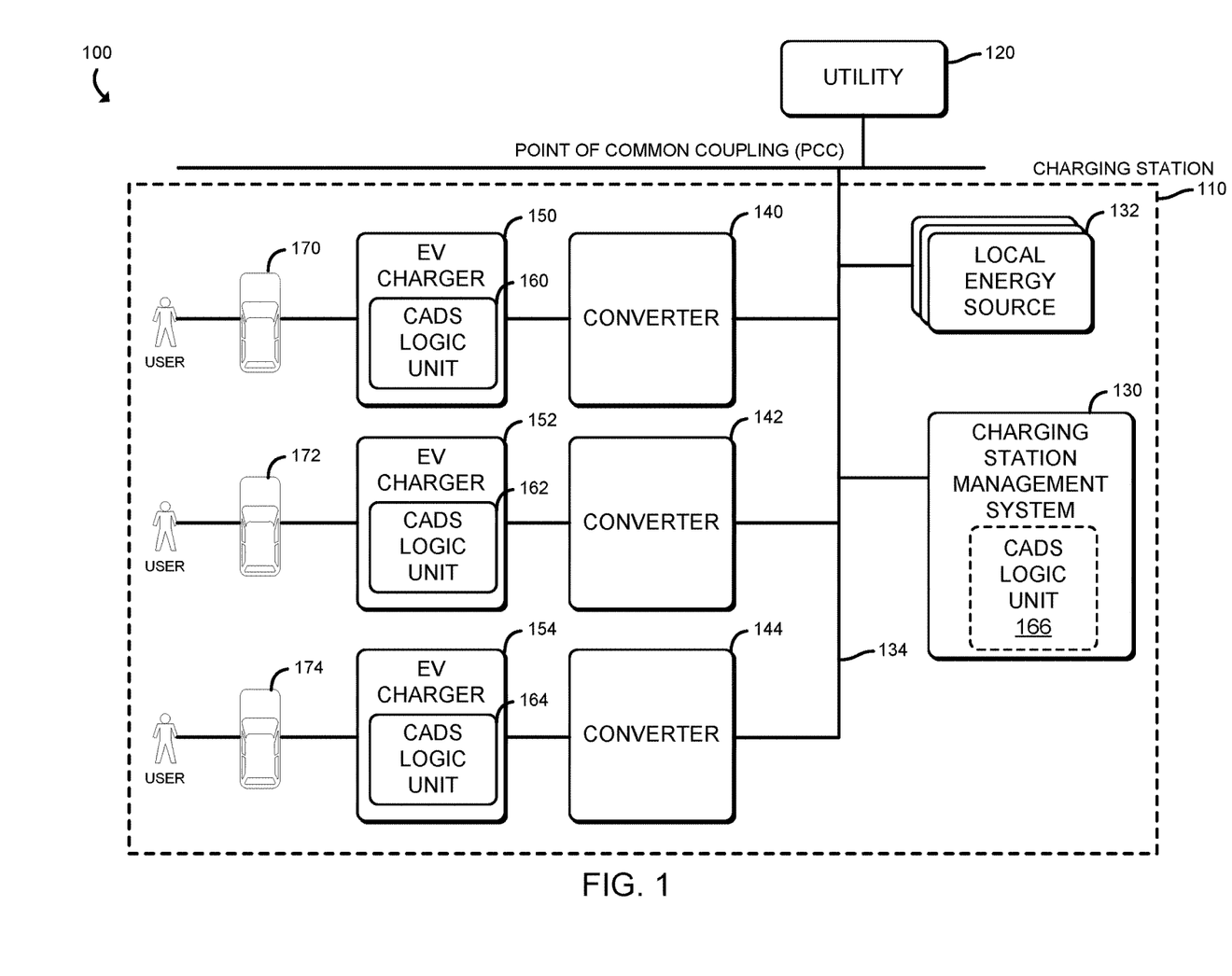
FIG. 1 is a simplified block diagram of at least one embodiment of a system for detecting abnormal activities in an electric vehicle charging station.

Referring now to FIG. 1, a system 100 for detecting abnormal activities includes an electric vehicle (EV) charging station 110 connected to a utility 120 (e.g., a producer of electrical power connected to the charging station 110 through an electrical grid). The charging station 110, in the illustrative embodiment, includes a charging station management system 130 connected to a set of local energy sources 132 and electric vehicle chargers 150, 152, 154. The utility 120 may include a distribution management system (DMS), distributed energy resource (DER) management system (DERMS), or supervisory control and data acquisition (SCADA) application configured to manage the operation of the electrical distribution grid and communicate with components of the charging station 110 (e.g., with the charging station management system 130). The local energy sources 132 may be embodied as any devices (e.g., distributed energy resources (DERs), distributed generations (DRs), such as wind, photovoltaic (PV), battery energy storage system (BESS), fuel cells, microturbines, diesel generators, flywheels, etc.) capable of providing energy to the electric vehicle chargers 150, 152, 154 on an as-requested basis. The charging station management system 130 may be embodied as any set of computers or other devices configured to send a control command to the local energy sources 132 to provide electrical power to the electric vehicle chargers 150, 152, 154 (e.g., to reduce a peak demand, to maintain voltage stability, etc.), to charge a BESS (e.g., a local energy source 132) during a predefined time period (e.g., non-peak hours), and to selectively enable or disable the ability of the electric vehicle chargers 150, 152, 154 to charge corresponding electric vehicles (e.g., electric vehicles 170, 172, 174) based on information received from the utility 120 and/or from the electric vehicle chargers 150, 152, 154.

In the illustrative embodiment, each electric vehicle charger 150, 152, 154, which may be connected to a corresponding converter 140, 142, 144 (e.g., any device or circuitry configured to convert alternating current (AC) to direct current (DC)), includes a collaborative anomaly detection system (CADS) logic unit 160, 162, 164, each of which may be embodied as any device or circuitry capable of detecting abnormal behaviors in the charging station 110 by monitoring both host-based activities (e.g., within the corresponding electric vehicle charger 150) and monitoring communications on a network 134 between the electric vehicle chargers 150, 152, 154 and other devices (e.g., the charging station management system 130, remote devices of a cloud service, etc.), determining whether any of the activities are abnormal (e.g., anomalies indicative of a cyber security threat) and performing a responsive action, as described in more detail herein. Additionally or alternatively, and as indicated in FIG. 1, in some embodiments, the charging station management system 130 may include a CADS logic unit 166, similar to the CADS logic units 160, 162, 164. As such, the CADS logic unit 166 may be configured to receive information (e.g., measurements, logs and system status) from the EV chargers 150, 152, 154 and execute the cyberattack detection (e.g., CADS) operations described with reference to the CADS logic units 160, 162, 164. In some such embodiments, the EV chargers 150, 152, 154 are not equipped with the CADS logic units 160, 162, 164 and the cyberattack detection operations are performed only by the charging station management system 130 (e.g., using the CADS logic unit 166).

In a conventional system that includes electric vehicle chargers and a BESS system, a coordinated cyberattack could create a voltage instability or thermal overload problem, potentially resulting in voltage collapse or protection misoperation at an electric distribution system (e.g., line trip). Other cyberattack scenarios may include: 1) false data injection attacks to sensors (e.g., meters) at an electric vehicle, electric vehicle supply equipment (EVSE), and/or at a utility connection point, in order to disrupt the economic variables (e.g., reduce or increase charging bills) or to create a safety hazard for maintenance/repair crews (e.g., by injecting fabricated measurements or status data indicating that an electric vehicle charging station is disconnected from the electrical grid or that the local generators (BESS) are disconnected). Other potential cyberattacks may be targeted at gaining access to an information technology (IT) system of an electric distribution grid using an EVSE's vulnerability, manipulating or faking status indicators by compromising an electric vehicle or EVSE's isolation monitoring device (IMD) to keep the electric vehicle charger energized (e.g., to create a high DC current that will present a safety hazard when EV owner is trying to charge his/her EV), to damage a DC cable of an electric vehicle charger by attacking a liquid cooled charging system (e.g., for high DC current), or to cause a battery malfunction (e.g., an explosion) by manipulating EV battery State of Charge (SoC) information. As described in more detail herein, the system 100, and in particular, each electric vehicle charger 150, 152, 154 is configured to detect and respond to attempted cyberattacks to increase the security and safety of the electric vehicle charging station 110 over conventional systems.

Figure 2:
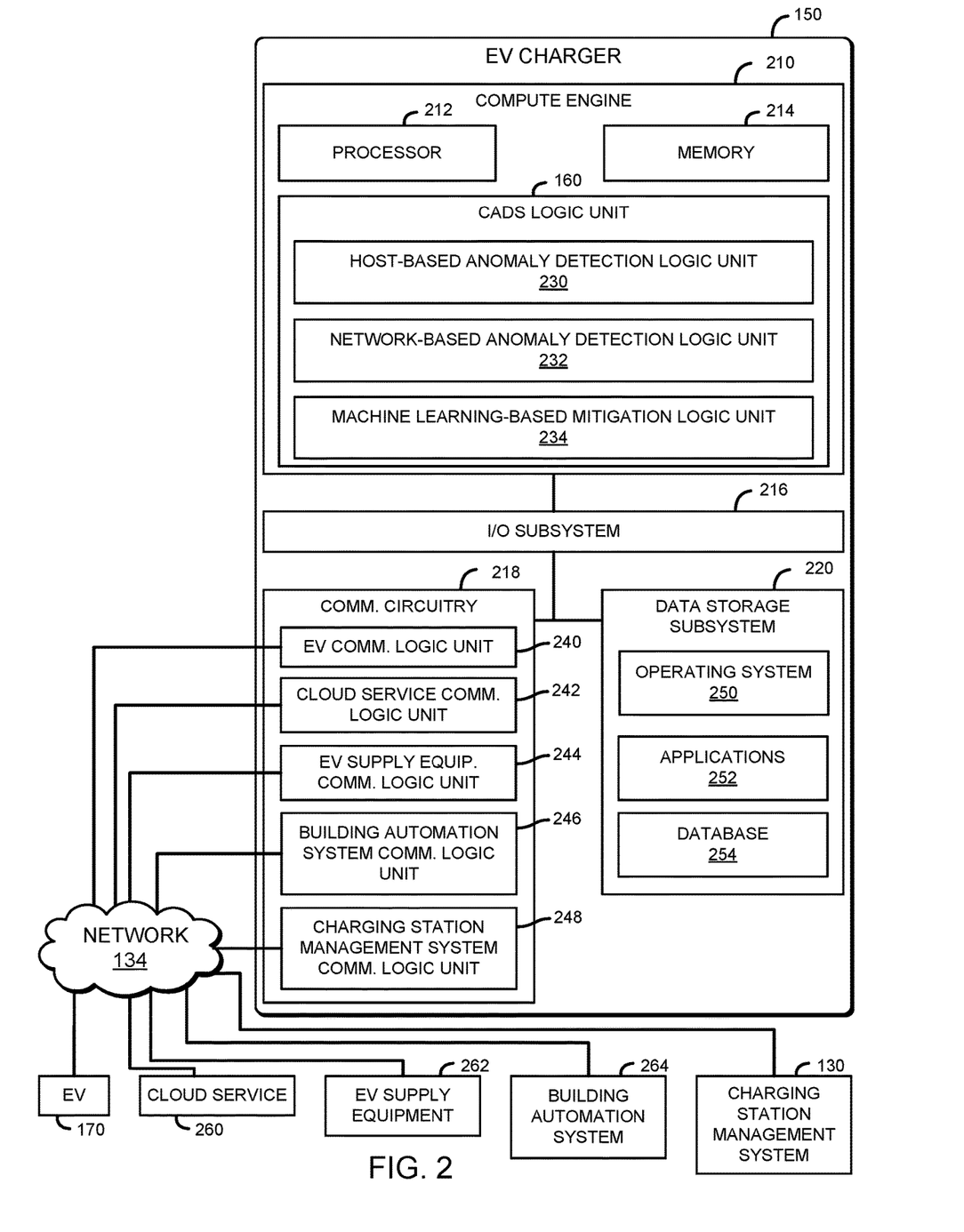
FIG. 2 is a simplified block diagram of at least one embodiment of an electric vehicle charger of the system of FIG. 1.

Referring now to FIG. 2, the electric vehicle charger 150 may be embodied as any type of device or combination or devices (e.g., a computer in combination with power electronics) capable of performing the functions described herein, including charging an electric vehicle (e.g., the electric vehicle 170), determining a cyber security threat level for a charging station (e.g., the charging station 110) in which the electric vehicle charger is located, and performing, as a function of the determined cyber security threat level, a responsive action to protect the charging station 110 from a cyber security threat (e.g., a cyberattack). The electric vehicle charger 150 may be capable of operating as a level 1 charger (e.g., 120 VAC with 1 kW), a level 2 charger (e.g., 240 VAC with 11 kW), a DC fast charger (e.g., 208 VDC with 24 kW), a DC fast charging station (e.g., 480 VDC with 50 kW), and/or a DC high power fast charger (e.g., 480 VDC with 350 kW), and/or other modes of operation.

As shown in FIG. 2, the illustrative electric vehicle charger 150 includes a compute engine 210, an input/output (I/O) subsystem 216, communication circuitry 218, and a data storage subsystem 220. Of course, in other embodiments, the electric vehicle charger 150 may include other or additional components, such as those commonly found in a computer (e.g., a display, etc.). Additionally, in some embodiments, one or more of the illustrative components may be incorporated in, or otherwise form a portion of, another component.

The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. Additionally, in some embodiments, the compute engine 210 includes or is embodied as a processor 212 and a memory 214. In the illustrative embodiment, the compute engine 210 additionally includes the CADS log unit 160. The processor 212 may be embodied as any type of processor capable of performing the functions described herein. For example, the processor 212 may be embodied as a microcontroller, a single or multi-core processor(s), or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 214 may be integrated into the processor 212. In operation, the main memory 214 may store various software and data used during operation such communications (e.g., packets) received from other devices (e.g., through the communication circuitry 218), log data produced by processes executed by the compute engine 210, applications, programs, libraries, and drivers.

The CADS logic unit 160, in the illustrative embodiment, includes a host-based anomaly detection logic unit 230, a network-based anomaly detection logic unit 232, and a machine learning-based mitigation logic unit 234. The host-based anomaly detection logic unit 230 may be embodied as any device or circuitry (e.g., a processor, an ASIC, etc.) configured to monitor the system and security logs generated by processes (e.g., operating system processes, application processes, etc.) executed by the compute engine 210 to identify whether an anomaly (e.g., an unauthorized file system modification, an unauthorized firmware update, an abnormal application installation, etc.) has occurred within the electric vehicle charger 150. The network-based anomaly detection logic unit 232 may be embodied as any device or circuitry (e.g., a processor, an ASIC, etc.) configured to monitor all communication connections of the electric vehicle charger 150 to other devices (e.g., devices in communication with the EV charger 150 through the communication circuitry 218). In doing so, the network-based anomaly detection logic unit 232 may detect network-based anomalies (e.g., denial of service (DoS) attacks, replay attacks, or unauthorized communication connections). The machine learning-based mitigation logic unit 234 may be embodied as any device or circuitry (e.g., a processor, an ASIC, etc.) configured to be trained (e.g., as a neural network or other machine learning algorithm) with training data indicative of normal operations (e.g., operations deemed normal, or operations with corresponding values (e.g., voltage values, current values, charging time periods, etc.) that fall within a predefined range (e.g., predefined tolerances)) and data indicative of anomalies (e.g., anomalies that have been previously identified as attacks against components of the charging station 110, operations that fall outside of predefined tolerances, operations associated with malfunctions, etc.). The training data may be continually updated (e.g., as new cyberattacks are identified). As such, the machine learning-based mitigation logic unit 234, in the illustrative embodiment, enables the CADS logic unit 160 to identify abnormal activities (e.g., anomalies) occurring within the electric vehicle charger 150 (e.g., based on data monitored by the host-based anomaly detection logic unit 230) and/or abnormal activities in communication connections with other devices (e.g., based on data monitored by the network-based anomaly detection logic unit 232). Furthermore, in the illustrative embodiment, the machine learning-based mitigation logic unit 234 is configured to determine a responsive action to perform, based on a determination of whether a cyberattack has been identified and the type of cyberattack that has been identified, such as by sending a control command to another device (e.g., another electric vehicle charger 152, 154 or the charging station management system 130) to disconnect a communication connection to the charging station, correcting compromised sensor measurements, blocking a start or stop command issued from another device to an electric vehicle charger 150, 152, 154, controlling the operation of a local energy source 132, dropping abnormal packets, issuing an alarm to one or more devices, and/or performing other responsive actions. While shown as being separate from the processor 212, in some embodiments, the CADS logic unit 160 may be incorporated into the processor 212.

The compute engine 210 is communicatively coupled to other components of the electric vehicle charger 150 via the I/O subsystem 216, which may be embodied as circuitry and/or components to facilitate input/output operations with the compute engine 210 (e.g., with the processor 212, the main memory 214, and/or the CADS logic unit 160) and other components of the electric vehicle charger 150. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the electric vehicle charger 150, into the compute engine 210.

The communication circuitry 218 may be embodied as any communication circuit, device, or collection thereof, capable of enabling communications over one or more communication connections (e.g., a network) between the electric vehicle charger 150 and other device(s) (e.g., an electric vehicle 170, a cloud service 260, electric vehicle supply equipment 262, a building automation system 264, the charging station management system 130, etc.). The communication circuitry 218 may be configured to use any one or more communication technology (e.g., wired or wireless communications) and associated protocols (e.g., Ethernet, Bluetooth®, Wi-Fi®, WiMAX, communication protocols for various charging cable types, including Type 1 (SAE J1772-2009), Yazaki, Type 2, (VDE-AR-E 2623-2-2), Mennekes, Type 3 (EV Plug Alliance connector), Scame, Type 4 (JEVS G105-1993), CHAdeMO, Combined Charging System, CCS, SAE J1772 signaling, etc.) to effect such communication.

The illustrative communication circuitry 218, in the illustrative embodiment, includes an electric vehicle communication logic unit 240, a cloud service communication logic unit 242, an electric vehicle supply equipment communication logic unit 244, a building automation system communication logic unit 246, and a charging station management system communication logic unit 248. The electric vehicle communication logic unit 240 may be embodied as any device or circuitry (e.g., a network interface controller, an integrated circuit in combination with power electronics, etc.) configured to charge and communicate (e.g., send and/or receive) data with an electric vehicle (e.g., the electric vehicle 170), such as through a corresponding charging cable or wirelessly. The data communicated through the electric vehicle communication logic unit 240 may include a status of charge of a battery of the electric vehicle 170 and/or isolation monitoring data (e.g., data indicative of whether the electric vehicle 170 is electrically grounded).

The cloud service communication logic unit 242 may be embodied as any device or circuitry (e.g., a network interface controller, an integrated circuit, etc.) configured to enable the charging station to communicate with the cloud service 260. The cloud service 260 may be embodied as one or more compute devices (e.g., computers) operated by a vendor for the control, maintenance, and/or configuration of the electric vehicle charger 150 and/or may provide a communication connection for network operators who are managing the operation of the charging station 110. Communications with the cloud service 260 may include control commands issued or receive by the electric vehicle 170 or the electric vehicle charger 150 to start or stop a charging operation. Further, the electric vehicle charger 150 may receive updates (e.g., firmware updates, training data updates, etc.) through the cloud service communication logic unit 242. Additionally, payment information may be exchange during a charging operation thorough the cloud service communication logic unit 242 (e.g., to send payment information to the cloud service 260).

The electric vehicle supply equipment communication logic unit 244 may be embodied as any device or circuitry (e.g., a network interface controller, an integrated circuit, etc.) configured to enable the electric vehicle charger 150 to communicate with electric vehicle supply equipment (e.g., the other electric vehicle chargers 152, 154). Through the electric vehicle supply equipment communication logic unit 244, the electric vehicle charger 150 may request additional charging power from another electric vehicle charger 152, 154 (e.g., to supply additional DC current to the electric vehicle 170 for fast charging). Additionally, the electric vehicle supply equipment communication logic unit 244 may enable the electric vehicle charger 150 to share data indicative of anomalies (e.g., abnormal packets) with the other electric vehicle chargers (e.g., with the CADS logic units 162, 164) to determine whether a cyberattack against the charging station 110 is occurring.

The building automation system communication logic unit 246 may be embodied as any device or circuitry (e.g., a network interface controller, an integrated circuit, etc.) configured to enable the electric vehicle charger 150 to communicate with a building automation system (BAMS) 264. For example, if a building hosts the charging station 110, monitoring and control data may be exchanged between the charging station 110 and the BAMS 264 (e.g., via the building automation system communication logic unit 246). If the electric vehicle chargers 150, 152, 154 are obtaining power through the same transformer(s) that the building is connected to, the communication connection through the building automation system communication logic unit 246 may be used to manage the use of power in the building (e.g., if the demand of the electric vehicle charging exceeds a predefined threshold during a peak load time period, the BAMS may issue a command to the electric vehicle charger 150 to stop electric vehicle charging operations or to reduce a charging power level to reduce the possibility of a power outage in the building). Similarly, the charging station management system communication logic unit 248 may be embodied as any device or circuitry (e.g., a network interface controller, an integrated circuit, etc.) configured to enable the electric vehicle charger 150 to communicate with the charging station management system 130 (e.g., to receive a control command to start or stop a charging operation, to send a command to the charging station management system 130 to stop charging a BESS, to send a command to the charging station management system to activate an alarm, etc.).

The data storage subsystem 220 may be embodied as any type of devices configured for short-term or long-term storage of data such as, for example, memory devices and circuits, memory cards, hard disk drives, solid-state drives, or other data storage devices. In the illustrative embodiment, the data storage subsystem includes data for an operating system 250 executed by the compute engine 210, one or more applications 252 executed by the compute engine 210, and a database 254. The operating system 250 and applications 252, in the illustrative embodiment, are the core software to operate the electric vehicle charger 150, including starting and stopping charging operations, managing payment data for charging operations, and reporting metering data (e.g., an amount of energy provided to electric vehicle(s) 170 over a given time period, etc.). The database 254 may be embodied as any set of data indicative of historical operational and system data (e.g., historical charging operations, data sent to or received from other devices, such as other electric vehicle chargers 152, 154 and/or the charging station management system 130, real-time price data for electricity, logs generated by the operating system 250 or applications 252, etc.). As described herein, the CADS logic unit 160 monitors the database 254 to identify abnormal activities (e.g., anomalies) indicative of a cyberattack.

The electric vehicle chargers 152, 154 and the charging station management system 130 may have components similar to those described in FIG. 2 with reference to the electric vehicle charger 150. The description of those components of the electric vehicle charger 150 is equally applicable to the description of components of the electric vehicle chargers 152, 154 and the charging station management system 130, with the exception that, in the illustrative embodiment the charging station management system 130 may not include the CADS logic unit 160 and all of the components of the communication circuitry 218. Further, it should be appreciated that any of the electric vehicle chargers 152, 154 and the charging station management system 130 may include other components, sub-components, and devices commonly found in a computing device, which are not discussed above in reference to the electric vehicle charger 150 and not discussed herein for clarity of the description.

The electric vehicle chargers 150, 152, 154, charging station management system 130, the electric vehicles 170, 172, 174, the building automation system 264, and the utility 120 are illustratively in communication via the network 134, which may be embodied as any type of wired or wireless communication network capable of communicating data, and/or data along with power, including power distribution lines, power transmission lines, electric vehicle charging cables, global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof. While shown as a single path between the devices of the system 100, the network 134 may include multiple cables, conductors, or other components to carry power and/or data.

Figure 3:
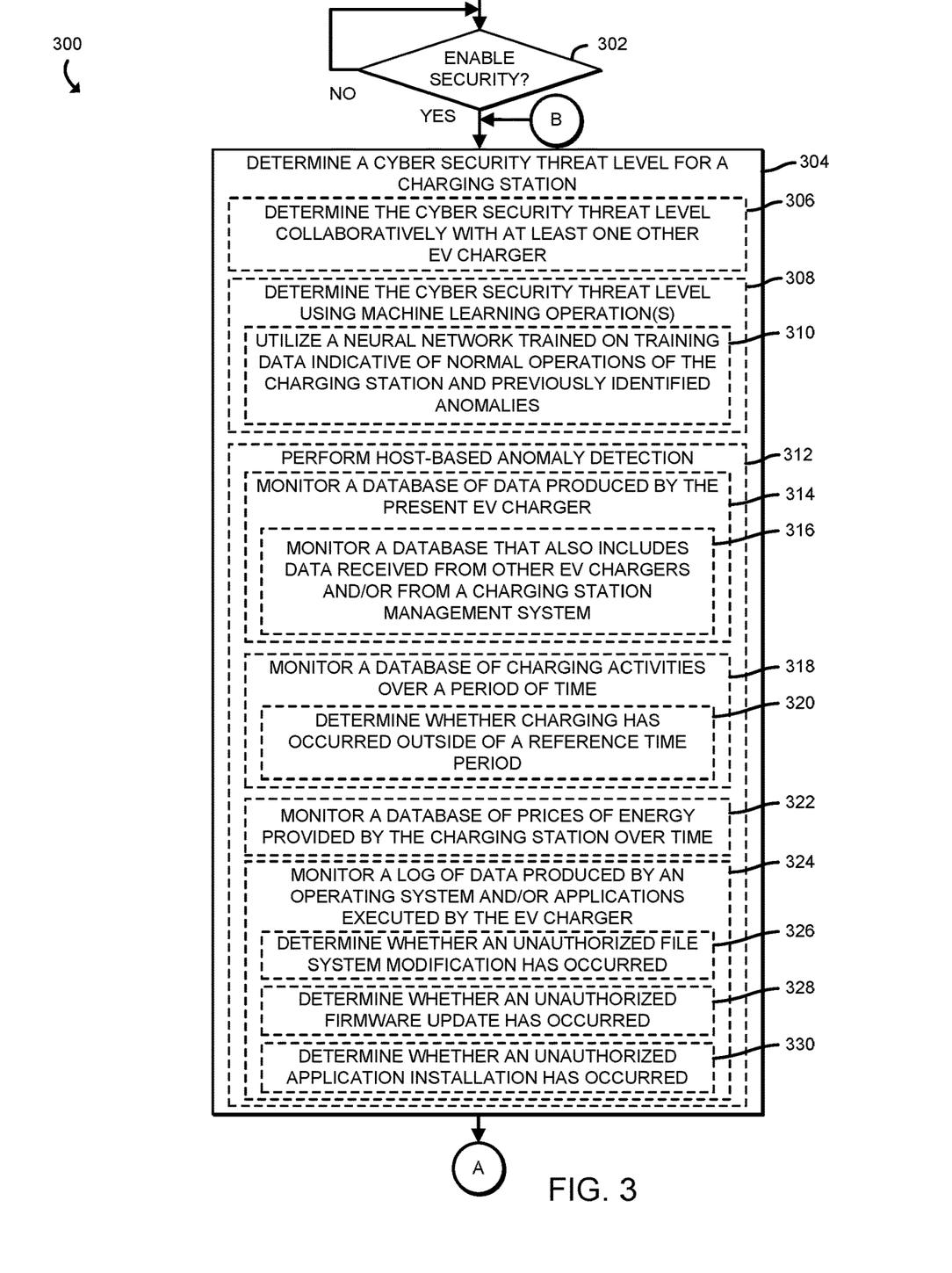
FIGS. 3-5 are a simplified block diagram of at least one embodiment of a method for detecting abnormal activities that may be performed by the electric vehicle charger of FIG. 2.

Referring now to FIG. 3, the electric vehicle charger 150, in operation may perform a method 300 for detecting abnormal activities (e.g., anomalies indicative of cyberattacks) and responding to them. The method 300 begins with block 302, in which the electric vehicle charger 150 determines whether to enable security (e.g., whether to utilize the CADS logic unit 160 to detect and respond to anomalies). In doing so, the electric vehicle charger 150 may determine whether the CADS logic unit 160 is present and operational (e.g., in response to a self-test operation), in response to a request (e.g., from the charging station management system 130, from the cloud service 260, from anther electric vehicle charger 152, 154, etc.) to enable security, and/or based on other factors. Regardless, in response to a determination to enable security, the method 300 advances to block 304, in which the electric vehicle charger 150 determines a cyber security threat level (e.g., whether one or more anomalies indicative of cyberattack(s) are present) for the charging station 110. In doing so, the electric vehicle charger 150 may determine the cyber security threat level collaboratively with at least one other electric vehicle charger 152, 154 (e.g., by sharing, with the other electric vehicle chargers 152, 154 in the charging station 110, data that may be indicative of one or more anomalies), as indicated in block 306. As indicated in block 308, the electric vehicle charger 150 may determine the cyber security threat level using machine learning operations. For example, and as indicated in block 310, the electric vehicle charger 150 may utilize a neural network that has been trained on training data indicative of normal operations of the charging station 110 (e.g., operations deemed normal, or operations with corresponding values (e.g., voltage values, current values, charging time periods, etc.) that fall within a predefined range (e.g., predefined tolerances)) and previously identified anomalies (e.g., anomalies that have been previously identified as attacks against components of the charging station 110, operations that fall outside of predefined tolerances, operations associated with malfunctions, etc.).

As indicated in block 312, the electric vehicle charger 150, in the illustrative embodiment, performs host-based anomaly detection (e.g., with the host-based anomaly detection logic unit 230). In doing so, the electric vehicle charger 150 monitors a database (e.g., the database 254) of data produced by the electric vehicle charger 150, as indicated in block 314. In the illustrative embodiment, the electric vehicle charger 150 may monitor a database that also includes data received from other electric vehicle chargers and/or the charging station management system 130 (e.g. the electric vehicle charger 150 may receive, via the electric vehicle supply equipment communication logic unit 244, data produced by the electric vehicle chargers 152, 154 and/or may receive, via the charging station management system communication logic unit 248, data produced by the charging station management system 130 and write the data to the database 254), as indicated in block 316. As indicated in block 318, the electric vehicle charger 150 may monitor a database of charging activities over a period of time (e.g., the database 254 may include charging information produced by the electric vehicle charger 150, one or more of the other electric vehicle chargers 152, 154, and/or the charging station management system 130). In doing so, the electric vehicle charger 150 may determine whether charging operations occurred outside of a reference time period (e.g., whether the charging station management system 130 has caused a BESS (e.g., one of the local energy sources 132) to charge during peak load hours (e.g., when the electric vehicle chargers 150, 152, 154 are being used the most), as indicated in block 320. The electric vehicle charger 150 may also monitor a database (e.g., the database 254) of prices of energy provided by the charging station 110 over time (e.g., to determine whether a change in price that exceeds a reference amount of change has occurred, indicating a potential unauthorized manipulation of price data), as indicated in block 322. As indicated in block 324, the electric vehicle charger 150 may monitor a log of data (e.g., in the database 254) produced by an operating system (e.g., the operating system 250) and/or application(s) (e.g., the applications 252) executed by the electric vehicle charger 150. In doing so, the electric vehicle charger 150 may determine whether an unauthorized file system modification has occurred, as indicated in block 326. Additionally or alternatively, the electric vehicle charger 150 may determine whether an unauthorized firmware update has occurred, as indicated in block 328, and/or whether an unauthorized application installation has occurred, as indicated in block 330.

Figure 4:
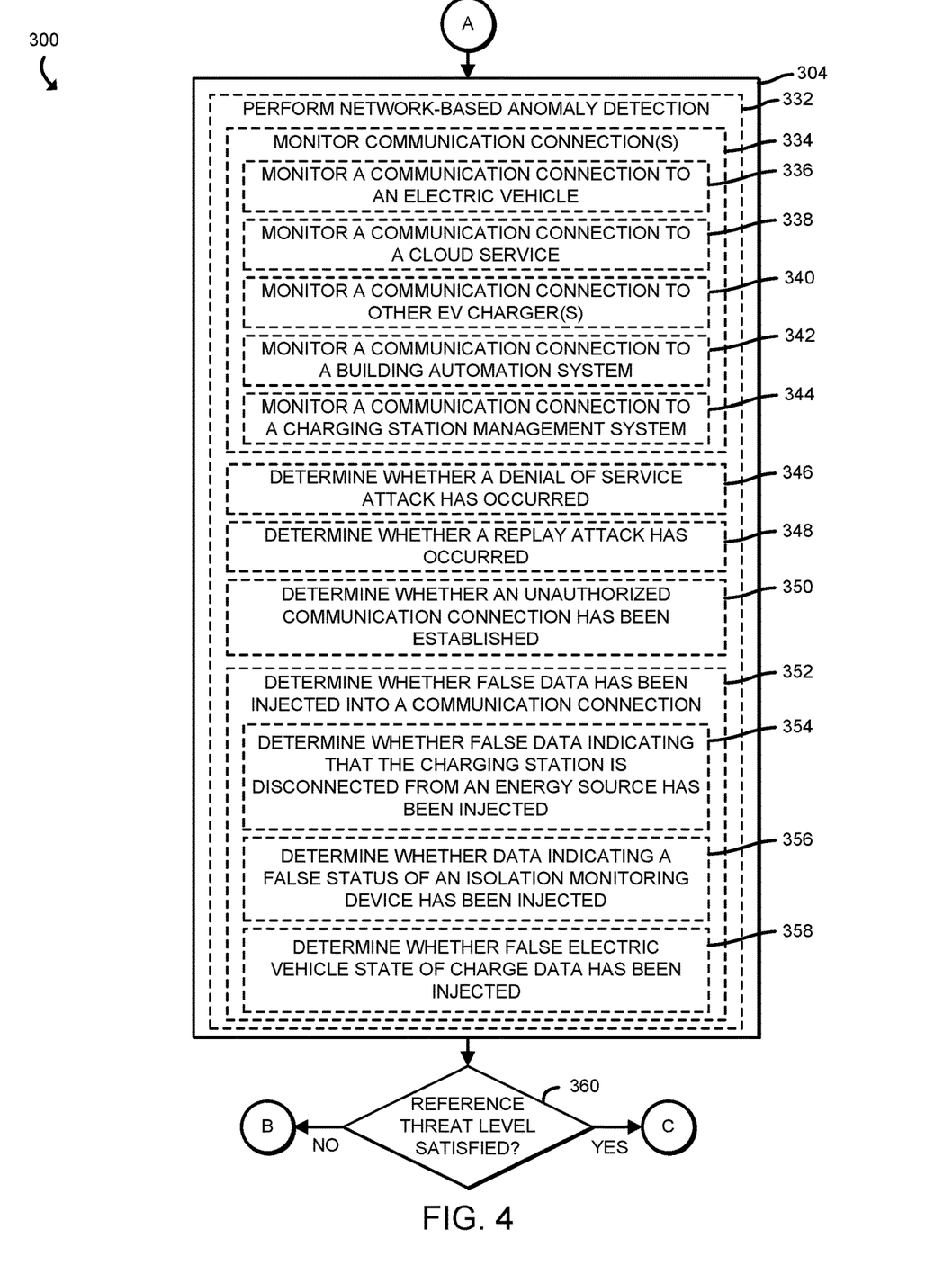

Referring now to FIG. 4, in determining a cyber security threat level, the electric vehicle charger 150 may also perform network-based anomaly detection (e.g., with the network-based anomaly detection logic unit 232), as indicated in block 332. In doing so, the electric vehicle charger 150, in the illustrative embodiment, monitors one or more communication connections, as indicated in block 334. For example, and as indicated in block 336, the electric vehicle charger 150 may monitor a communication connection to an electric vehicle (e.g., communications with the electric vehicle 170 via the electric vehicle communication logic unit 240). Additionally or alternatively, the electric vehicle charger 150 may monitor a communication connection to a cloud service (e.g., communications with the cloud service 260 via the cloud service communication logic unit 242), as indicated in block 338. The electric vehicle charger 150 may also monitor a communication connection to other electric vehicle chargers (e.g., communications with the electric vehicle chargers 152, 154 via the electric vehicle supply equipment communication logic unit 244), as indicated in block 340. Additionally or alternatively, the electric vehicle charger 150 may monitor a communication connection to a building automation system (e.g., communications with the building automation system 264 via the building automation system communication logic unit 246), as indicated in block 342. As indicated in block 344, the electric vehicle charger 150 may monitor a communication connection to a charging station management system (e.g., communications with the charging station management system 130 via the charging station management system communication logic unit 248).

Based on monitoring the communication connections (e.g., in block 334), the electric vehicle charger 150 may determine whether a denial of service attack has occurred (e.g., a cyberattack in which the attacker attempts to overload one or more target devices with requests for service, thereby making the target device(s) unable to provide services for other users), as indicated in block 346. As indicated in block 348, the electric vehicle charger 150 may determine whether a replay attack (e.g., an attack in which a valid data transmission is maliciously or fraudulently repeated or delayed to misdirect a target device into performing an operation on behalf of the attacker, rather than on behalf of the original sender of the data transmission) has occurred. Additionally or alternatively, the electric vehicle charger 150 may determine whether an unauthorized communication connection has been established (e.g., a compute device of an attacker has joined a virtual private network of the charging station 110), as indicated in block 350. As indicated in block 352, the electric vehicle charger 150 may determine whether false data has been injected into a communication connection. In doing so, and as indicated in block 354, the electric vehicle charger 150 may determine whether false data indicating that the charging station 110 is disconnected from a power source (e.g., the utility 120) has been injected. For example, the electric vehicle charger 150 may compare data from one communication connection (e.g., data allegedly from the charging station management system 130, indicating that the utility 120 is disconnected) to data from one or more other communication connections (e.g., data from one or more of the electric vehicle chargers 152, 154 indicating that the charging station management system 130 issued an instruction to those electric vehicle chargers 152, 154 to discontinue charging operations because the local energy source 132 (e.g., a BESS) is recharging from the utility 120) to identify a discrepancy indicative of the false data injection.

Additionally or alternatively, the electric vehicle charger 150 may determine whether data indicating a false status of an isolation monitoring device has been injected (e.g., by determining whether data allegedly from the isolation monitoring device has been signed with a private key of the isolation monitoring device), as indicated in block 356. Additionally or alternatively, and as indicated in block 358, the electric vehicle charger 150 may determine whether false electric vehicle state of charge data has been injected (e.g., by determining whether state of charge data allegedly from the electric vehicle 170 has been signed with a private key of the electric vehicle 170, by determining whether the reported state of charge is plausible based on a known battery capacity of the electric vehicle 170, an amount of time that the electric vehicle 170 has been charging, and a power level at which the electric vehicle 170 has been charging, and/or based on other factors). Subsequently, and as indicated in block 360, the electric vehicle charger 150 determines whether a reference threat level has been satisfied. In the illustrative embodiment, if any anomalies have been detected in block 304, the reference threat level has been satisfied. In response to a determination that the reference threat level has not been satisfied, the method 300 loops back to block 304 in FIG. 3 to again determine a cyber security threat level for the charging station 110 (e.g., by analyzing subsequent data). Otherwise, the method 300 advances to block 362 of FIG. 5, in which the electric vehicle charger 150 performs, as a function of the determined cyber security threat level, a responsive action to protect the charging station 110 (e.g., one or more devices in the charging station 110).

Figure 5:
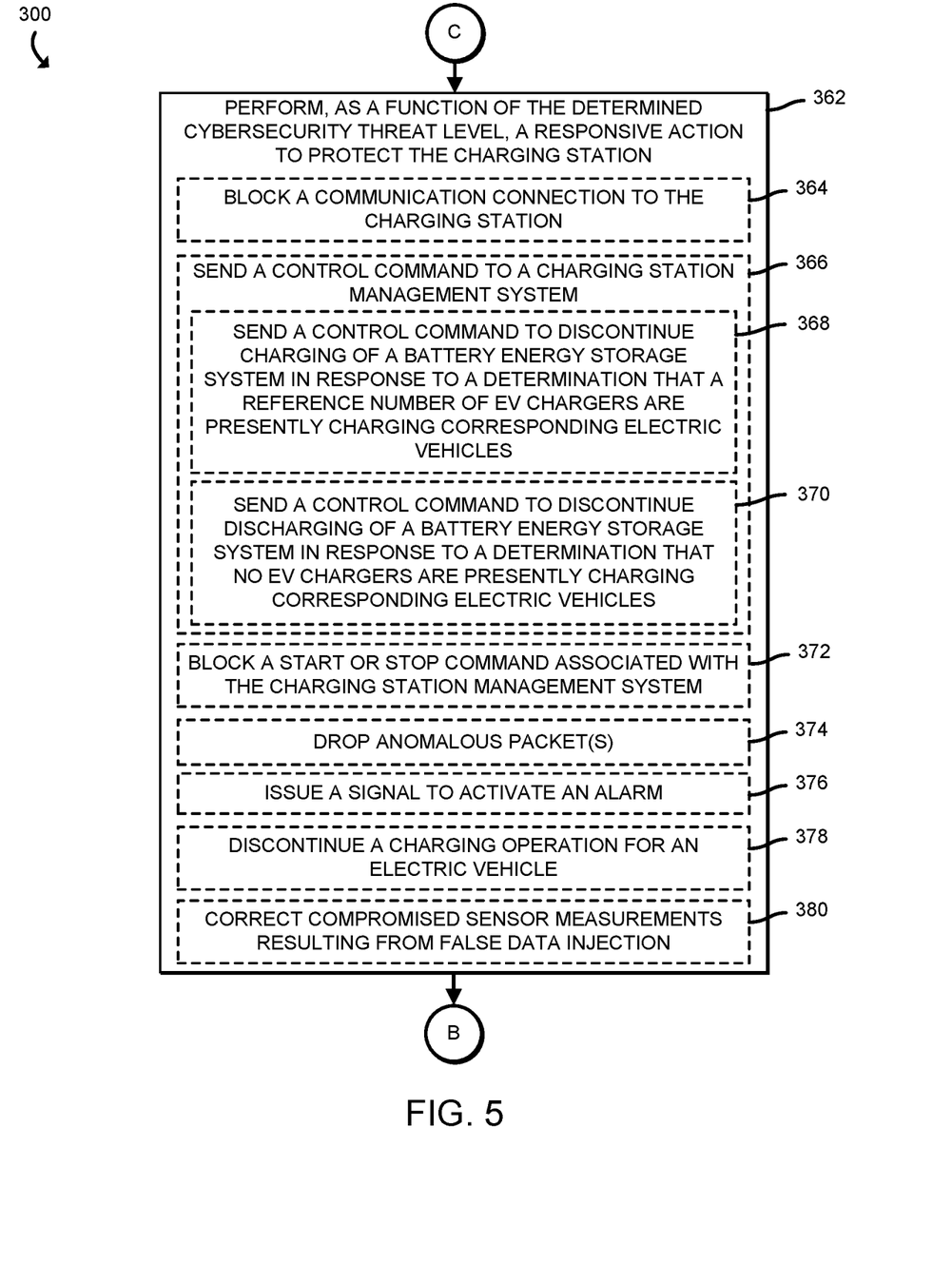

Referring now to FIG. 5, in performing the responsive action, the electric vehicle charger 150 may block a communication connection to the charging station (e.g., an unauthorized communication connection identified in block 350, a communication connection through which a denial of service attack or replay attack has been initiated, etc.), as indicated in block 364. As indicated in block 366, the electric vehicle charger 150 may send a control command to a charging station management system (e.g., to the charging station management system 130). In doing so, the electric vehicle charger 150 may send a control command to discontinue charging of a BESS in response to a determination that a reference number of electric vehicle chargers 150, 152, 154 are presently charging corresponding electric vehicles 170, 172, 174 (e.g., to stop the BESS from being charged during a peak load time period), as indicated in block 368. Alternatively, the electric vehicle charger 150 may send a control command to discontinue discharging of a BESS in response to a determination that no electric vehicle chargers 150, 152, 154 are presently charging a corresponding electric vehicle 170, 172, 174 (e.g., to prevent the BESS from discharging into distribution lines of a distribution grid and potentially causing a thermal overload (i.e., a line overload) and an opening (i.e., a trip) of corresponding circuit breakers), as indicated in block 370. As indicated in block 372, the electric vehicle charger 150 may block a start or stop command associated with (e.g., sent by or allegedly sent by) the charging station management system 130 (e.g., to prevent an electric vehicle charger 150, 152, 154 from charging an electric vehicle while the BESS is recharging). Further, and as indicated in block 374, the electric vehicle charger 150 may drop (e.g., discard) one or more anomalous packets received on a corresponding communication connection, issue a signal (e.g., to the charging station management system 130) to activate an alarm, as indicated in block 376, discontinue a charging operation for an electric vehicle (e.g., in response to a determination that false state of charge information has been received), as indicated in block 378, and/or correct compromised (e.g., falsified) sensor measurements resulting from false data injection (e.g., correct the state of charge information associated with an electric vehicle), as indicated in block 380. Afterwards, the method 300 loops back to block 304 to again determine a cyber security threat level for the charging station 110 (e.g., based on newly received data). While the method 300 is described above with reference to the electric vehicle charger 150 performing the operations, it should be understood that any apparatus (e.g., the other electric vehicle chargers 152, 154 and/or the charging station management system 130) equipped with a corresponding CADS logic unit 160, 162, 164, 166 may perform the operations of the method 300.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. An apparatus comprising:
circuitry configured to:
determine a cyber security threat level for a charging station in which an electric vehicle charger is located, wherein the cyber security threat level is defined by whether one or more anomalies indicative of cyberattack(s) are present, including determining whether false data indicative of an incorrect status of a connection to a utility has been injected into a communication connection of the charging station by comparing (i) data identified as originating from a charging station management system and pertaining to the connection status to the utility to (ii) data received from multiple electric vehicle chargers of the charging station and pertaining to the utility to identify a discrepancy; and
perform, as a function of the determined cyber security threat level, a responsive action to block a communication connection to the charging station in order to protect the charging station from a cyber security threat.

2. The apparatus of claim 1, wherein to determine a cyber security threat level comprises to determine, in collaboration with at least one other electric vehicle charger, the cyber security threat level.

3. The apparatus of claim 1, wherein to determine a cyber security threat level comprises to determine the cyber security threat level using one or more machine learning operations.

4. The apparatus of claim 3, wherein to determine the cyber security threat level comprises to determine the cyber security threat level with a neural network that has been trained on data indicative of a reference set of normal operations of the charging station and previously identified anomalies.

5. The apparatus of claim 1, wherein to determine the cyber security threat level comprises to monitor a database of data produced by the electric vehicle charger.

6. The apparatus of claim 5, wherein to monitor a database of data produced by the electric vehicle charger comprises to monitor a database that additionally includes data received by the electric vehicle charger from at least one of another electric vehicle charger or the charging station management system.

7. The apparatus of claim 5, wherein the circuitry is further configured to:
monitor data indicative of charging operations over a predefined period of time; and
determine whether a charging operation occurred outside of a reference time period.

8. The apparatus of claim 5, wherein the circuitry is further configured to monitor data indicative of prices of energy provided by the charging station over time.

9. The apparatus of claim 5, wherein the circuitry is further configured to monitor a log of data produced by an operating system or one or more applications executed by the electric vehicle charger.

10. The apparatus of claim 9, wherein the circuitry is further configured to determine whether an unauthorized file system modification has occurred, whether an unauthorized firmware update has occurred, or whether an unauthorized application installation has occurred.

11. The apparatus of claim 1, wherein to determine the cyber security threat level comprises to monitor one or more communication connections to the charging station.

12. The apparatus of claim 11, wherein the circuitry is further configured to determine whether a denial of service attack has occurred, whether a replay attack has occurred, or whether an unauthorized communication connection to the charging station has been established.

13. The apparatus of claim 1, wherein to perform a responsive action comprises to send a control command to the charging station management system.

14. The apparatus of claim 13, wherein to send a control command to the charging station management system comprises to send, in response to a determination that a battery energy storage system is being charged while a predefined number of electric vehicle chargers of the charging station are charging corresponding electric vehicles, a control command to discontinue charging of the battery energy storage system.

15. The apparatus of claim 13, wherein to send a control command to the charging station management system comprises to send, in response to a determination that a battery energy storage system is discharging to a distribution grid when no electric vehicles are charging at the charging station, a control command to discontinue the discharging of the battery energy storage system.

16. The apparatus of claim 1, wherein to perform a responsive action comprises to block a start or stop command associated with the charging station management system, drop one or more anomalous packets, issue a signal to activate an alarm, discontinue charging of an electric vehicle, or correct one or more compromised sensor measurements.

17. A method comprising:
determining, by an apparatus, a cyber security threat level for a charging station in which an electric vehicle charger is located, wherein the cyber security threat level is defined by whether one or more anomalies indicative of cyberattack(s) are present, including determining whether false data indicative of an incorrect status of a connection to a utility has been injected into a communication connection of the charging station by comparing (i) data identified as originating from a charging station management system and pertaining to the connection status to the utility to (ii) data received from multiple electric vehicle chargers of the charging station and pertaining to the utility to identify a discrepancy; and
performing, by the apparatus and as a function of the determined cyber security threat level, a responsive action to block a communication connection to the charging station in order to protect the charging station from a cyber security threat.

18. One or more machine-readable storage media comprising a plurality of instructions stored thereon that, in response to being executed, cause an apparatus to:
determine a cyber security threat level for a charging station in which an electric vehicle charger is located, wherein the cyber security threat level is defined by whether one or more anomalies indicative of cyberattack(s) are present, including determining whether false data indicative of an incorrect status of a connection to a utility has been injected into a communication connection by comparing (i) data identified as originating from a charging station management system and pertaining to the connection status to the utility to (ii) data received from multiple electric vehicle chargers of the charging station and pertaining to the utility to identify a discrepancy; and
perform, as a function of the determined cyber security threat level, a responsive action to block a communication connection to the charging station in order to protect the charging station from a cyber security threat.

* * * * *